United States Patent
Lim et al.

[11] Patent Number: 6,112,060
[45] Date of Patent: *Aug. 29, 2000

[54] COMMUNICATION DEVICE WITH A SIGNAL SWITCH ASSEMBLY

[75] Inventors: Han Teong Lim; Munirah Jusoh; Ruslan Ghazalli, all of Penang, Malaysia

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/929,378

[22] Filed: Sep. 15, 1997

[51] Int. Cl.⁷ .................................................. H04B 1/44
[52] U.S. Cl. ............................... 455/78; 455/83; 455/129
[58] Field of Search .......................... 455/78, 129, 82, 455/83, 575, 277.1, 277.2; 343/702

[56] References Cited

U.S. PATENT DOCUMENTS

| | | | |
|---|---|---|---|
| 4,661,992 | 4/1987 | Garay et al. | 455/89 |
| 4,803,447 | 2/1989 | Schultz et al. | 455/277.1 |
| 5,278,570 | 1/1994 | Jaramillo et al. | 343/702 |
| 5,574,987 | 11/1996 | Wallace | 455/82 |
| 5,577,269 | 11/1996 | Ludewig | 455/90 |
| 5,801,661 | 9/1998 | Suzuki | 455/90 |
| 5,822,705 | 10/1998 | Lehtola | 455/575 |
| 5,903,850 | 5/1999 | Huttunen et al. | 455/557 |

*Primary Examiner*—Reinhard J. Eisenzopf
*Assistant Examiner*—Duc Nguyen
*Attorney, Agent, or Firm*—Andrew S. Fuller

[57] ABSTRACT

A communication device (10) for receiving or transmitting radiofrequency (rf) signals has a transceiver (12), signal processing circuitry (14) and a signal switch assembly (16). Assembly (16) has a jack (18), an antenna matching circuit (20) and a bypass circuit (22). Rf signals are provided to transceiver (12) through antenna matching circuit (20) when an antenna is connected to jack (18). However, antenna matching circuit (20) is bypassed so that the rf signals are provided to transceiver (12) through bypass circuit (22) when a connector from a signal cable is connected to jack (18). Bypass circuit (22) is actuated as such when a ground member of such a connector electrically connects a ground contact (26) and one other contact (28) within jack (18). Ground contact (26) and other contact (28) are annularly disposed around a signal contact (24) of jack (18).

5 Claims, 2 Drawing Sheets

COMMUNICATION DEVICE WITH A SIGNAL SWITCH ASSEMBLY

FIELD OF THE INVENTION

This invention relates to communication devices with switch assemblies. In particular, this invention relates to, but is not necessarily limited to, a communication device with a signal switch assembly for switching radiofrequency (rf) signals.

BACKGROUND OF THE INVENTION

Radio communication devices such as two way radios typically have transceivers for receiving and transmitting radio frequency (rf) signals via antennas. Such antennas have varying impedances which require matching circuits for matching to circuitry within the transceivers. Conventionally, antennas are connected to jacks on housings for the radios. Connecting antennas with jacks enable the housings to be used for different circuitry that may require different antennas. In addition, these jacks also allow the radios to be connected to external devices such as test equipment.

However, antennas and test equipment are known to have different input impedances. To alleviate signal loss due to impedance mismatches resulting from the different input impedances, rf signals are conventionally switched to an appropriate matching circuit or signal path. The matching circuit or signal path selected depends on whether an antenna or test equipment is being connected.

In the art, switch assemblies enables the rf signals to be switched to the matching circuit or signal path accordingly. A problem in such assemblies is that inadvertent signal coupling can occur when switching occurs at signal contacts that are in close proximity to sensitive electrical components. Space to isolate such components to thereby alleviate this problem is limited as radios are developed to be smaller in size. Although shielding sensitive electrical components can also alleviate this problem, such shielding adds cost as well as requires space.

SUMMARY OF THE INVENTION

It is an object of this invention to overcome or at least alleviate at least one of the problems associated communication devices with switch assemblies.

According to one aspect of the invention, there is provided a communication device comprising:

a receiver for receiving signals;

signal processing circuitry coupled to said receiver for processing said signals; and a signal switch assembly coupled to said receiver for switching said signals, said assembly comprising:

a jack adapted to complementary engage an antenna, said jack having a ground contact, a signal contact and at least one other contact;

an antenna matching circuit electrically connecting said signal contact to said receiver; and a bypass circuit electrically connecting said receiver to said other contact for bypassing said antenna matching circuit when said other contact is electrically connected to said ground contact.

Preferably, said assembly can further comprise a connector having a ground member, said ground member being to connect said other contact to said ground contact when said connector is coupled to said jack.

Suitably, said communication device can further comprise a transmitter for transmitting signals provided from said signal processing circuitry.

Preferably, said ground contact and said other contact can be annularly disposed relative to said signal contact.

Suitably, said ground contact and said other contact can be disposed on the same plane.

Alternatively, said ground contact can be disposed on a different plane relative to said other contact.

Preferably, said jack can comprise an insulator for insulating said ground contact and said other contact from said signal contact.

Suitably, said bypass circuit can comprise a diode.

Preferably, said bypass circuit can further comprise a capacitor coupled to said diode.

Suitably, said bypass circuit can further comprise a choke coupled to said diode.

BRIEF DESCRIPTION OF THE DRAWINGS

In order to describe the invention and to put it into practical effect, reference will now be made to preferred embodiment as illustrated with reference to the accompanying drawings in which.

DETAILED DESCRIPTION OF THE INVENTION

Figure 1:
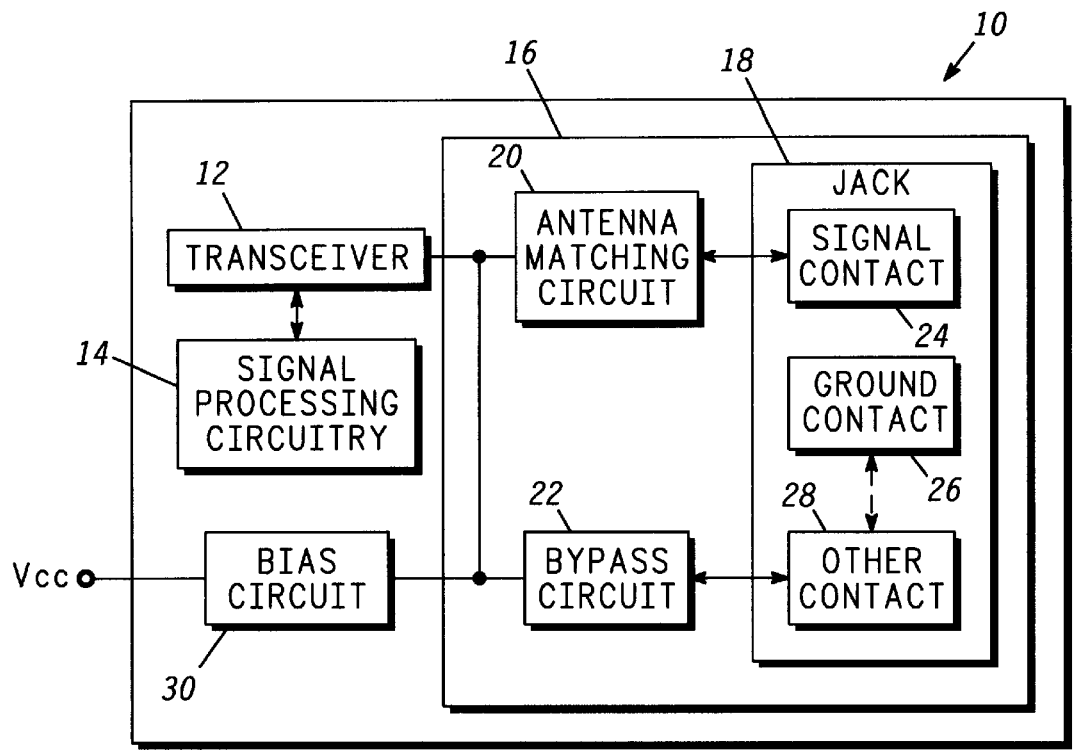
FIG. 1 shows a block diagram of a communication device in accordance with a preferred embodiment of the invention.

FIG. 1 shows a schematic block diagram of a communication device 10 in accordance with a preferred embodiment of the invention. Communication device 10 comprises a transceiver 12, signal processing circuitry 14 and a signal switch assembly 16. Transceiver 12, as is known in the art, includes a receiver for receiving and a transmitter for transmitting radiofrequency (rf) signals. Signal processing circuitry 14 couples to transceiver 12 and processes these rf signals.

Assembly 16 comprises a jack 18, an antenna matching circuit 20 and a bypass circuit 22. Jack 18 comprises a signal contact 24, a ground contact 26 and at least one other contact 28. Antenna matching circuit 20 and bypass circuit 22 electrically connects signal contact 24 and other contact 28 to transceiver 12 respectively. As shown in FIG. 1, bypass circuit 22 is biased to voltage supply Vcc with bias circuitry 30.

Jack 18 is adapted to complementary engage an antenna (not shown) to receive or transmit rf signals. These rf signals are switched between antenna matching circuit 20 and bypass circuit 22 within assembly 16. Bypass circuitry 22 operates when other contact 28 is electrically connected to ground contact 26. As a result of bypass circuitry 22 operating, antenna matching circuit 20 is bypassed to thereby switch the rf signals.

Advantageously, the invention enables switching of the rf signals to be made at jack 18 which is not in close proximity to sensitive electrical components within communication device 10. Such switching therefore alleviates the inadvertent signal coupling in conventional switch assemblies.

Figure 2:
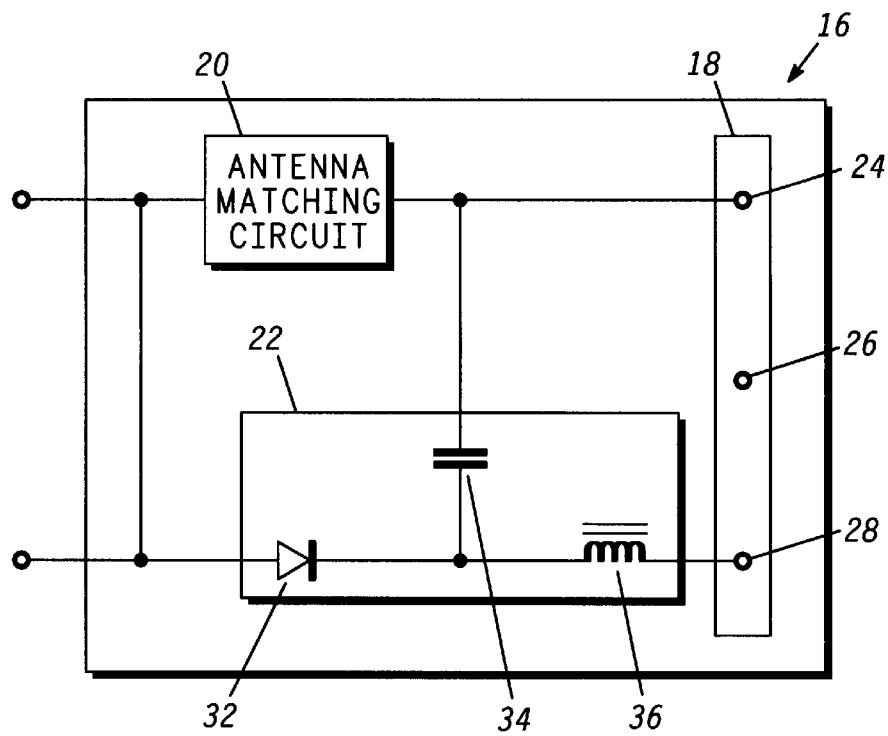
FIG. 2 is a schematic block diagram of a signal switch assembly for the communication device of FIG. 1.

FIG. 2 is a schematic block diagram of assembly 16. Bypass circuitry comprises a diode 32, a capacitor 34 and an inductor choke 36. Diode 32 can be, for example, a PIN diode. When other contact 28 is electrically connected to ground contact 26, diode 32 is operatively biased to enable rf signals to be conducted through jack 18 via capacitor 34. At the same time, any direct current (dc) signal will be shunted through choke 36 to ground.

Figure 3:
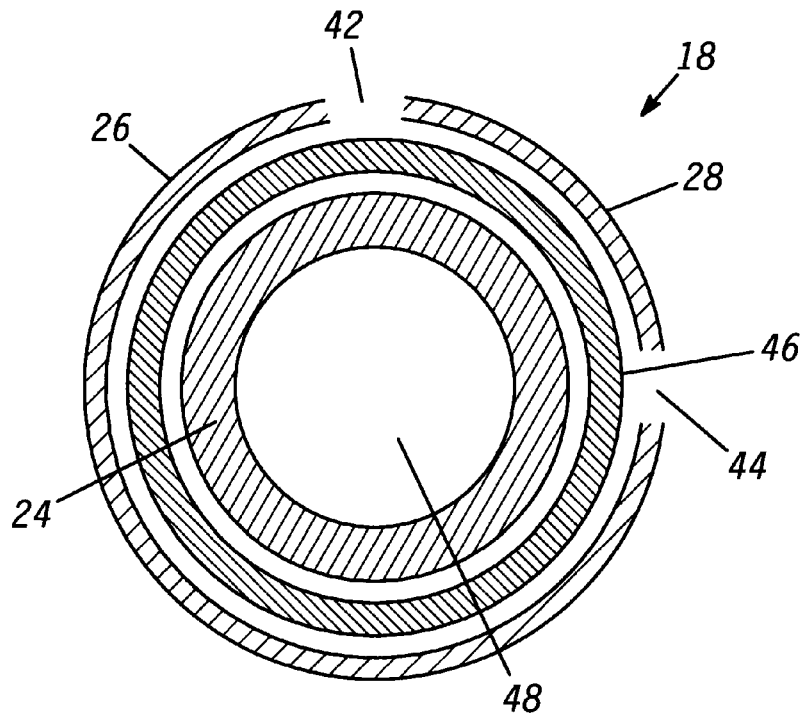
FIG. 3 is a plan cross section of one embodiment of a jack for the signal switch assembly of FIG. 2.

FIG. 3 is a plan cross section of one embodiment of jack 18 showing disposition of signal contact 24, ground contact 26 and other contact 28 relative to each other. In this embodiment, ground contact 26 and other contact 28 are annularly disposed relative to signal contact 24. Gaps 42,44 separate other contact 28 from ground contact 26. Insulator 46 insulates signal contact from both ground contact 26 and other contact 28.

Assembly 16 can further comprise a connector (not shown) having a ground member to connect other contact 28 to ground contact 26. Electrical connection of ground contact 26 and other contact 28 is made when the connector, for example, a standard 500 BNC (Bayonet Navy Connector) is coupled to jack 18. Such a connector will typically have a conductive core that couples into an aperture 48 of jack 18. When coupled as such, an electrical connection is thus provided for the rf signals to pass from the connector to signal contact 24.

Figure 4:
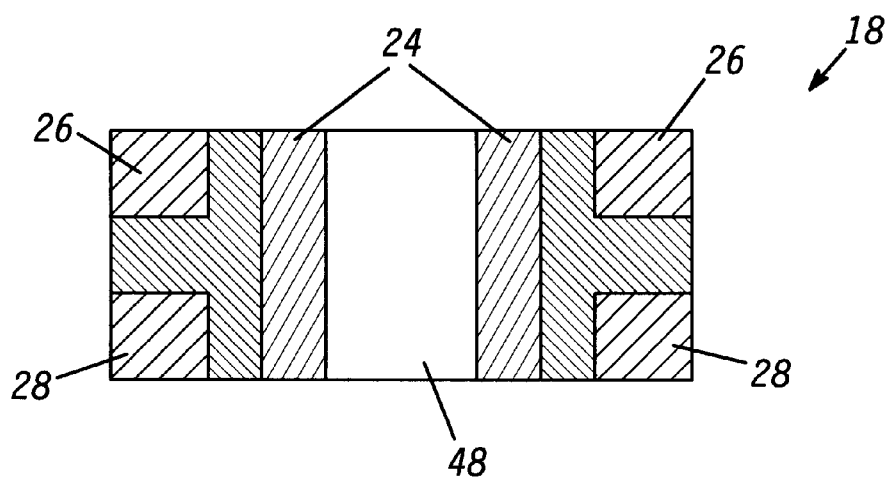
FIG. 4 is a lateral cross section of an alternative embodiment of the jack for the signal switch assembly of FIG. 2.

Ground contact 26 and other contact 28 in the embodiment of jack 18 shown in FIG. 3 are disposed on the same plane. FIG. 4, however, shows a lateral cross section of an alternative embodiment of jack 18 in which ground contact 26 and other contact 28 are annularly disposed on a different plane relative to signal contact 24.

This invention advantageously provides for switching of rf signals with connectors coupled to jack 18 to thereby alleviate inadvertent signal coupling in conventional switch assemblies. As these connectors can be standard connectors, additional cost to communication device 10 as a result of assembly 16 will be due to bypass circuit 22 only. Furthermore, even when adaptors are required for adapting jack 18 for coupling to these standard connectors, such adaptors are already commercially available.

We claim:

1. A communication device comprising:

a transceiver for transmitting and receiving signals;

signal processing circuitry coupled to said transceiver for processing said signals, and a signal switch assembly coupled to said transceiver for switching said signals, said assembly comprising:

a jack adapted to complementary engage an antenna, said jack having a ground contact, a signal contact and at least one other contact and said jack adapted to alternatively engage a connector, said connector having a signal terminal for coupling to said signal contact, and said connector having an electrically conductive portion, said ground contact and said at least one other contact of said jack being arranged to abut the electrically conductive portion of said connector to electrically connect said ground contact and said at least one other contact of said jack when said connector engages said jack;

an antenna matching circuit electrically connecting said signal contact to said transceiver; and a bypass circuit electrically connecting said transceiver to said signal contact for bypassing said antenna matching circuit when said other contact is electrically connected to said ground contact by said conductive portion of said connector.

2. The communication device as claimed in claim 1 wherein said ground contact and said other contact are annularly disposed relative to said signal contact.

3. The communication device as claimed in claim 2 wherein said ground contact and said other contact are disposed on the same plane.

4. The communication device as claimed in claim 2 wherein said ground contact is disposed on a different plane relative to said other contact.

5. The communication device as claimed in claim 1 wherein said jack comprises an insulator for insulating said ground contact and said other contact from said signal contact.

* * * * *